United States Patent [19]

Umaba

[11] 4,314,292

[45] Feb. 2, 1982

[54] MAGNETIC RECORDING OR REPRODUCING APPARATUS

[75] Inventor: Takayuki Umaba, Nagano, Japan

[73] Assignee: Kabushiki Kaisha Sankyo Seiki Seisakusho, Nagano, Japan

[21] Appl. No.: 136,851

[22] Filed: Apr. 3, 1980

[30] Foreign Application Priority Data

Apr. 7, 1979 [JP]   Japan ............................. 54-46397[U]

[51] Int. Cl.³ .................... G11B 5/82; G11B 17/00; G11B 21/12
[52] U.S. Cl. .................................. 360/86; 360/75; 360/107
[58] Field of Search ............. 360/86, 105, 107, 133, 360/97-99, 75

[56] References Cited

U.S. PATENT DOCUMENTS

| | | | |
|---|---|---|---|
| 2,562,665 | 7/1951 | Grimm | 360/86 |
| 3,047,663 | 7/1962 | Zimmermann | 360/86 |
| 3,922,717 | 11/1975 | Zimmermann | 360/86 |
| 4,223,359 | 9/1980 | Galvagni | 360/133 |

*Primary Examiner*—Alfred H. Eddleman
*Attorney, Agent, or Firm*—James C. Wray

[57] ABSTRACT

A magnetic recording or reproducing apparatus comprising a rotatable magnetic body for recording or reproducing information detachably mounted on a rotating support which is driven by a motor, a magnetic head for magnetically transmitting the information to or from said magnetic body, said magnetic head being adapted to move in association with a cam mounted on a member for detecting the position of said magnetic head, said position detecting member including portions which are arranged, respectively, to start and turn off means for driving the apparatus and a portion which does not drive said driving means while a sensor is located on said portion, and means for recording the information to be stored in said magnetic body or for reproducing same stored therein.

10 Claims, 7 Drawing Figures

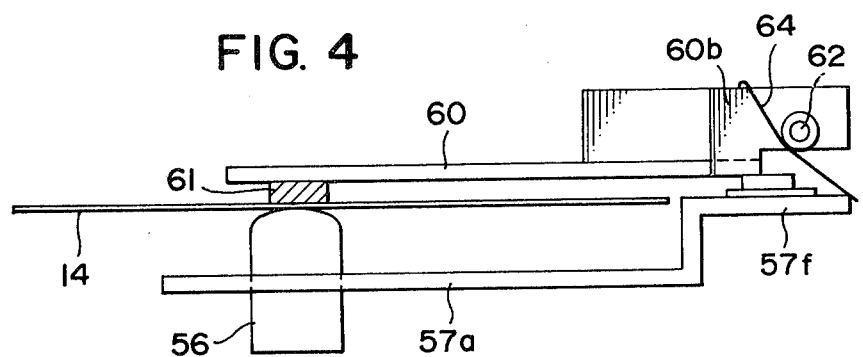
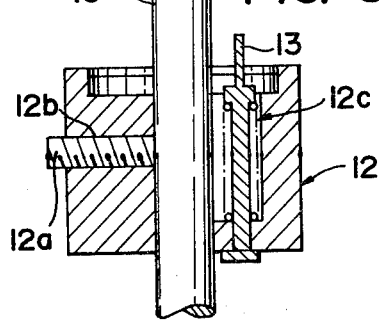
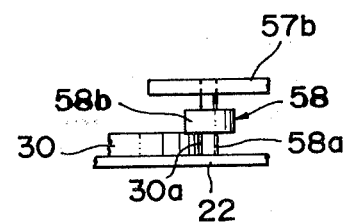
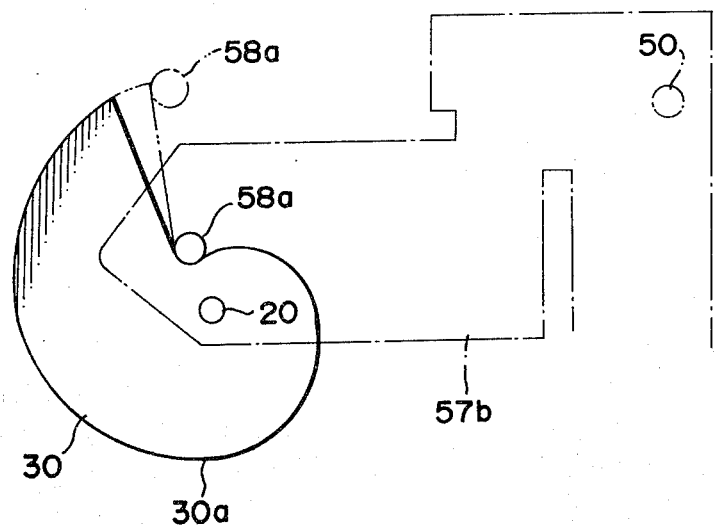

MAGNETIC RECORDING OR REPRODUCING APPARATUS

BACKGROUND OF THE INVENTION

The present invention relates to a magnetic recording or reproducing apparatus and, more particularly, to a magnetic recording or reproducing apparatus capable of recording or reproducing information by abutting a magnetic head with a rotating disc-shaped magnetic body.

Heretofore, there is known an apparatus for magnetically recording verbal information or the like spirally on a magnetic recording disc and reproducing such information from said disc by moving a magnetic head while abutting it with the said disc. In the conventional magnetic recording or reproducing apparatus of this type, the positioning of the magnetic head at a predetermined position is difficult and its construction and structure are so complicated that it is difficult to assemble it. The conventional apparatus requires a special means for returning the magnetic head to its original position from a position where the operation of the magnetic head terminates. To this end, the conventional apparatus is provided with means for reversely rotating a driving device. The conventional apparatus also includes a system in which its magnetic head is returned from the terminal position to the original position while still being in abutment with the magnetic disc. Accordingly, this system has the disadvantage of damaging information tracks formed spirally on the magnetic disc while the magnetic head is traversing the information tracks while in abutment with the magnetic disc and causing dropouts for reproduction.

SUMMARY OF THE INVENTION

Accordingly, the primary object of the present invention is to provide a magnetic recording or reproducing apparatus in which the positioning of a magnetic head is carried out with ease and precision.

Another object of the present invention is to provide a magnetic recording or reproducing apparatus in which a magnetic head is returned to its original position from its working position without causing any adverse action on information tracks on a magnetic recording disc.

A further object of the present invention is to provide a magnetic recording or reproducing apparatus comprising a magnetic body for recording or reproducing information; a magnetic head for sensing said information; means for supporting said magnetic recording or reproducing body; means for mounting said magnetic body; means for driving and rotating said magnetic body mounting means; means for supporting said magnetic head; means for mounting said magnetic head supporting means; means for pressing said magnetic head to thereby clamping said magnetic body; means for detecting the position of said magnetic head supporting means; means for mounting said position detecting means; a cam mounted integrally on said position detecting means; means for sliding along and in abutment with the cam face of said cam; said sliding means mounted integrally with said magnetic head supporting means; means for rotating said magnetic head supporting means against the action provided by the movement of said sliding means; means for transmitting the rotating force provided by said driving means to said position detecting means in a decelerating manner; and means for sensing the position for starting and terminating recording or reproduction of said information.

BRIEF DESCRIPTION OF DRAWINGS

FIG. 3 is a schematic elevation illustrating the magnetic head supporting members of the apparatus of the present invention.

FIG. 4 is a vertical section of the card locking drum in accordance with the present invention.

FIG. 5 is a partial elevation illustrating the pickup in accordance with the present invention.

FIG. 6 is a perspective view illustrating the principle for returning the pickup in accordance with the present invention.

DETAILED DESCRIPTION OF PREFERRED EMBODIMENTS

Figure 1A:
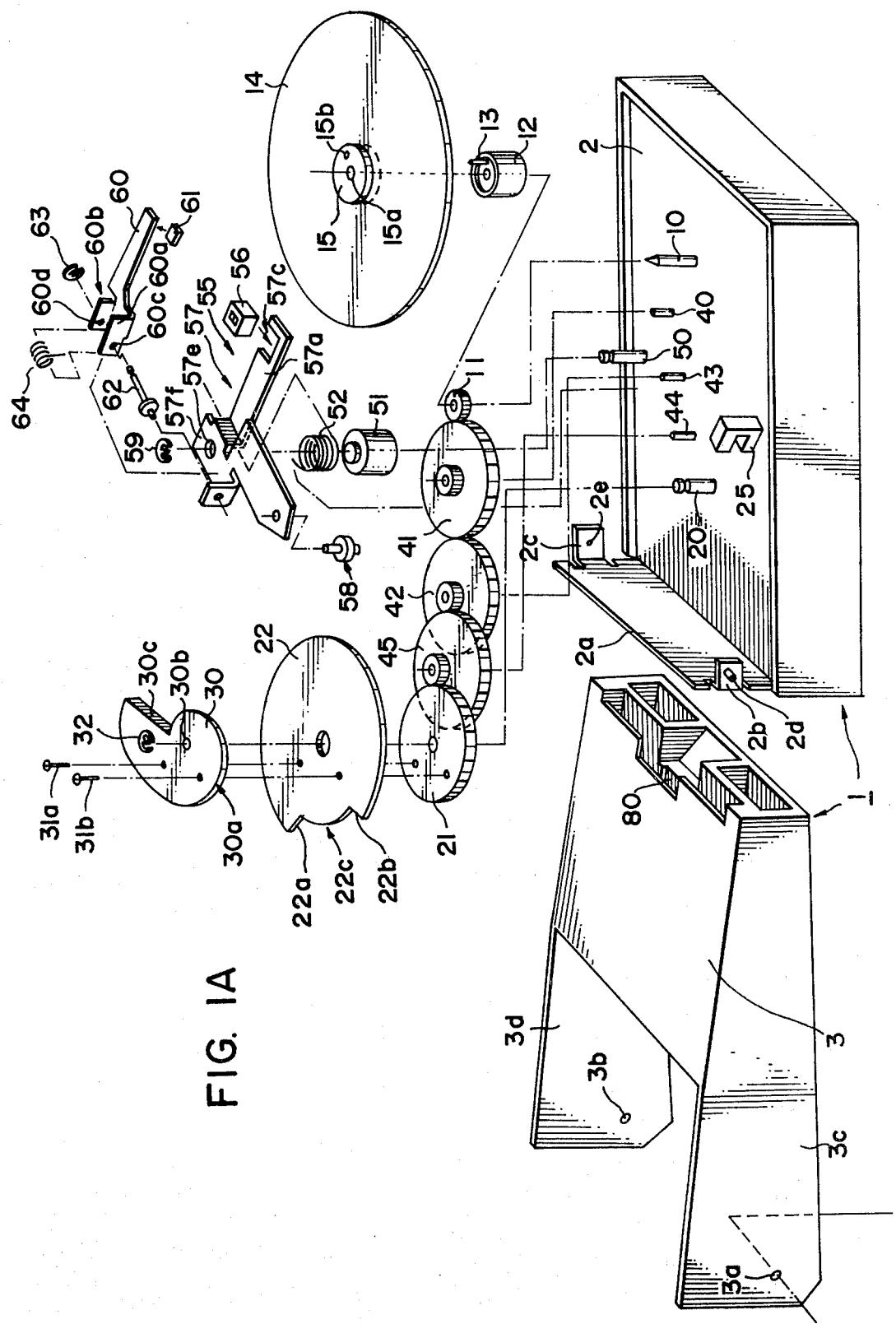
FIG. 1 is an exploded perspective view illustrating parts or components constituting the magnetic recording or reproducing apparatus of the present invention.
Figure 1B:
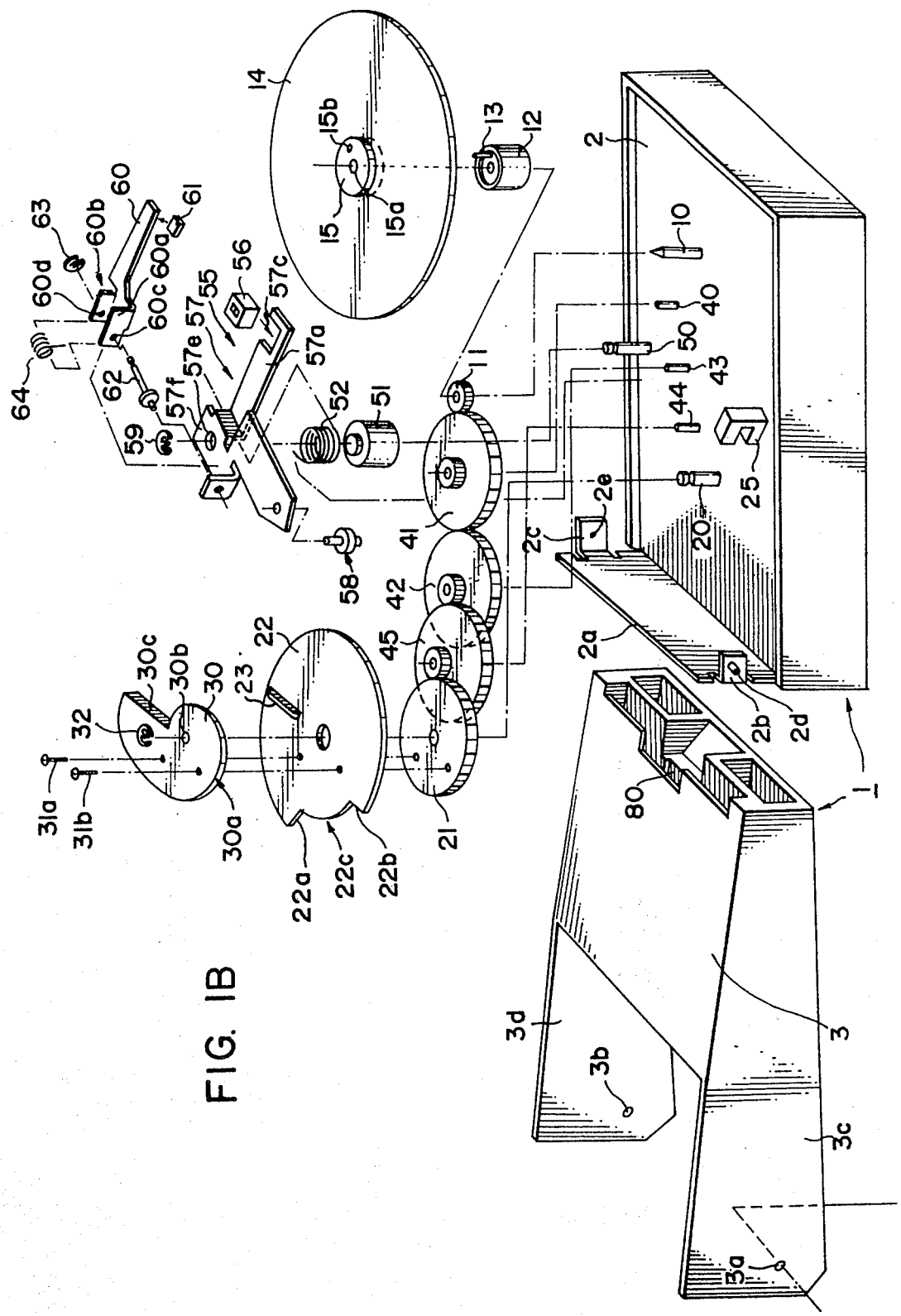
Figure 2:
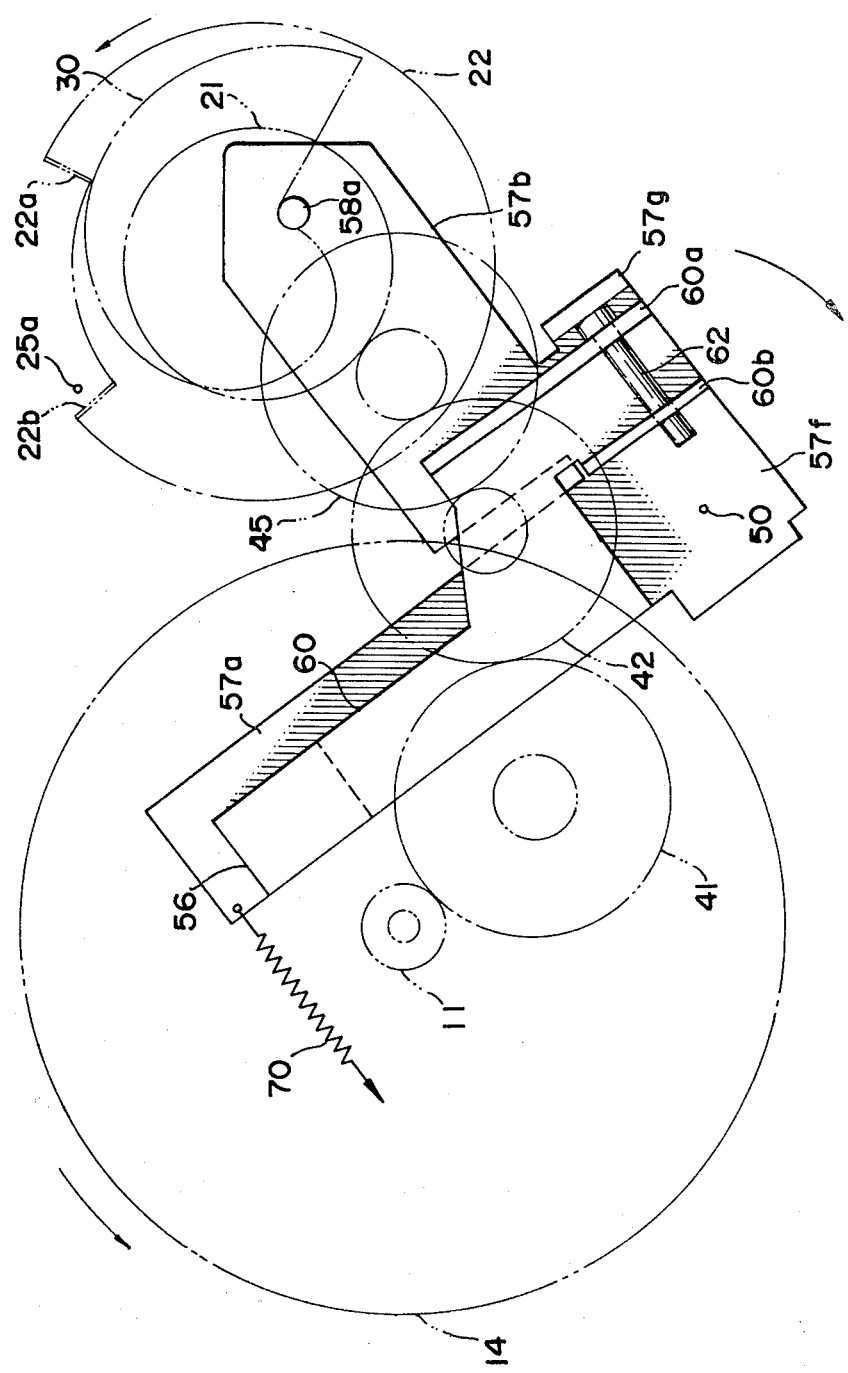
FIG. 2 is a schematic plan view illustrating the magnetic recording or reproducing apparatus of the present invention.

Turning now to FIGS. 1 and 2, the magnetic recording and reproducing apparatus according to the present invention includes a housing 1 which accomodates various parts and mechanism necessary to operate the apparatus. The housing 1 comprises a base 2 and a protective cover 3. The base 2 includes a rear wall member 2a extending upwardly from the rear side thereof which is provided with side members 2b and 2c having pivot pins 2d and 2e, respectively, which are pivotably mounted to the protective cover 3 through holes 3a and 3b of the respective side walls 3c and 3d thereof. This arrangement may permit the protective cover 3 to be opened or closed when needed.

With the arrangement of one embodiment of the present invention, there are shown a plurality of shafts provided on the upper surface of the base 2. These shafts function as means for mounting necessary parts embodying the apparatus of the invention. A shaft 10 is rotatably mounted on the base 2 and to a motor (not shown) functioning as means for driving and rotating the above means, which is provided under and within the upper surface of the base. A gear wheel 11 is securedly and integrally mounted on the shaft 10. On the gear wheel 11 is secured means for supporting a magnetic body 14 for recording or reproducing information including a card locking drum or boss 12 which can rotate integrally and concomitantly with the shaft 10 driven by the motor. The magnetic body 14, generally in the force of a disc, is mounted on the drum 12 through a movable locking pin 13, thereby allowing the disc body to be secured to the drum and rotated in synchronization with the rotation of the drum 12 and the shaft 10.

As best seen in FIG. 3, the drum or boss 12 may be composed of the drum or boss body, a screw 12a and the locking pin 13. A hole 12b is provided in the body, extending horizontally and parallel to the upper surface thereof in the radial direction to the horizontal hole through which the shaft 10 extends straight and all way out. The screw 12a extends through the hole 12b to the circumference of the shaft 10 and fixes the drum to the shaft. The drum 12 is also provided with the locking pin 13 which is mounted upwardly or downwardly movably by means of a compression spring 12c, thereby allowing the pin to engage with the hole 15b of the magnetic recording body 14. Where the drum or boss 12 is integrally fixed to the shaft 10, it is difficult to position the body 14 in agreement with the cam members and adjust the mutual positions of the body and the cam members after they are assembled. This arrangement in accordance with the present invention enables the boss to be positioned in correspondence with the cam members even after assembly.

Turning back to FIGS. 1 and 2, the magnetic disc body 14 is joined or connected integrally and concentrically to a collar 15 having a hole 15b which is engageable with the locking pin 13. The engagement of the disc 14 with the pin 13 allows the disc to rotate through the shaft 10 by means of the motor.

A shaft 20 is provided in alignment with the shaft 10 on the upper surface of the base and a gear wheel 21 is rotatably mounted thereon. The gear wheel 21 is then threadly secured to a member 22 for detecting the position of a magnetic head and a cam 30 mounted on the position detecting member 22 by means of any appropriate means. The assembly may be arranged to be rotatable in association with the rotation of the gear wheel 11 of the shaft 10.

The transmission of the rotating force from the gear wheel 11 to the wheel 21 may be carried out in conventional manner as long as the revolutions of the gear wheel 11 can be transmitted to the wheel 21 in decelerating or decreasing manner. In one embodiment in accordance with the present invention, a plurality of gear wheels having different gear numbers is provided between the wheels 11 and 21, each gear wheel being mounted rotatably on the corresponding shafts aligned with each other on the upper surface of the base 2. For example, a shaft 40 is provided in horizontal alignment with the shaft 10 on the base and a gear wheel 41 mounted thereon is arranged to be engaged with the gear wheel 11 and further to be engaged with a gear wheel 42 mounted on a shaft 43 positioned opposedly adjacent to the shaft 40. The gear shaft 42 is further arranged to be engageable with a gear wheel 45 mounted on a shaft 44 aligned opposedly to the shaft 43. The gear wheel 45 is then arranged in such a manner that it is engageable with the wheel 21, thereby allowing the rotating force of the gear wheel 11 to be deceleratingly transmitted to the wheel 21 to an appropriate extent. The number of wheels and gear numbers on the wheels may not be restricted to particular ones and any modifications may be chosen as long as the rotating force of a motor is decelerated to an appropriate degree. Alternatively, a timing belt engageable with a gear pulley also may be utilized in place of the gear wheels 41, 42 and 45.

The position detecting member 22 includes a lift portion 23 mounted integrally on the upper surface thereof and in a radial direction. The lift portion 23 performs a function for lifting and transporting a pickup 58 to its original position, as will be described in detail hereinbelow. The member 22 also has its peripheral circumference two cut-away edges 22a and 22b and a cut-away portion 22c. The cut-away edge 22a functions as providing signals for recording or reproducing information stored in the disc 14 and the other cut-away edge 22b as discontinuing the recording or reproducing. The cut-away portion 22c is defined between the two cut-away edges 22a and 22b and by an inner peripheral circumference defined between the inner positions of the said edges. While the sensing portion of a sensor 25 composed of a photocoupler, which is mounted on the upper surface of the base 2, is positioned in the cut-away portion 22c, no signals are provided so that no information is recorded or reproduced. The cut-away portion 22c is provided in order that neither recording nor reproduction be carried out for a period of time during which the motor is accelerated to a desired stationary condition.

The cam face 30a of the cam 30 has a peripheral circumference having a curve formed by following the path of a point in a plane moving around a centered point of the shaft hole 30b of the cam 30 while continuously receding proportional to the angle of the rotation of the cam 30 from a point apart from the shaft hole 30b, i.e., the point having a shortest distance between the hole 30b and the point from which the pickup 58 starts (hereinafter referred to as an "original position" for brevity of explanation) to a point far apart from the shaft hole 30b, i.e., the point reached by one full revolution of the cam around the cam shaft 20 (hereinafter referred to as a "terminal position" for brevity of explanation). A cut-away edge portion 30c defined by the shortest and longest points is provided on the cam 30 in a manner such that the cut-away cam edge portion is engageable with the lift portion 23 of the position detecting member 22. The cam 30 is secured through two screws 31a and 31b to the position detecting member 22 and the gear wheel 21, thereby rotating integrally therewith. An E-shape ring 32 is mounted around the shaft hole 30b to be engageable with the top portion of the shaft 30, thereby preventing the withdrawal of the cam from the shaft.

A shaft 50 is mounted on the upper surface of the base 2 in alignment with the other shafts. A collar 51 is securedly mounted on the shaft 50 in order to determine the positioning of a magnetic head unit 55 which is rotatably positioned through a coiled spring 52 over the collar in a manner as will be described hereinafter.

The magnetic head unit 55 comprises a magnetic head 56 and a magnetic head supporting lever 57 consisting of arm members 57a and 57b which are disposed in a manner orthogonal to each other. The arm member 57a has a cut-away portion 57c engageably holding the magnetic head 56. The arm member 57b is provided with a hole 57d through which a pickup 58 is secured thereto. The magnetic head supporting lever 57 is rotatably mounted on the shaft 50 through a shaft hole 57e provided on a connection portion 57f of the arm members 57a and 57b. The magnetic head supporting lever 57 is rotatable around the shaft 50 in a clockwise direction and returnable to its original position by means of the coiled spring 52 mounted under the magnetic head supporting lever in such a manner that the coiled spring provides it with a counter-clockwisely rotating force around the shaft 50.

A lever 60 for holding a pad 61 is mounted on the magnetic head supporting lever 57 in a position and alignment opposing and parallel to the length of the arm member 57a thereof. The pad 61 is provided on the end portion of the pad holding lever 60 in a manner such that the pad is positioned in a position facing the magnetic head 56. The pad holding lever 60 is secured pivotably to the magnetic head supporting lever 57, for example, by means of a pivot shaft 62 which is securedly engageable with a hole 57g provided on a side member 57h extending from the arm member 57a and upwardly from the connection portion 57f of the magnetic head supporting member 57. The pad holding lever 60 is provided at the position opposing to the pad with two side wall members 60a and 60b extending lengthwisely and upwardly from the side sections of the lever. The two side wall members 60a and 60b have each a hole 60c and 60d, respectively, through which the bar member of the pivot shaft 62 extends all the way out in a manner that the pad holding member 60 is pivotably mounted around the bar member thereof. The bar member of the shaft 62 is provided with an E-ring 63 at the position outside the side wall member 60b positioned far apart from the side wall member 57h, whereby the pad holding lever 60 is not withdrawn from the shaft 62.

Turning to FIG. 4, there is shown an arrangement of the coiled spring 64 on the pad holding member 60 in which one end of the coiled spring is in engagement with the end portion of the connection portion 57f of the magnetic head holding lever 57 and the other end of the spring in engagement with the top portion of the side wall member 60b. This arrangement allows the pad 61 to press downwardly on the upper surface of the magnetic recording body 14, thereby providing a constant pressure toward the magnetic head 56 and enabling the pad and the magnetic head to clamp the magnetic recording body 14. The magnetic recording body is in turn allowed to abut the lower surface thereof with the upper surface of the magnetic head 56 while pressing the magnetic head at a constant pressure.

Turning back to FIG. 1, the coiled spring 52 is mounted between the collar 51 and the magnetic head lever 57 in a manner that a rotating force in the clockwise direction is provided for the magnetic head supporting lever, thereby permitting the pickup 58 fixed under the arm member 57b of the lever to be brought into contact with the cam face 30a of the cam 30. As can be best seen in FIG. 5, the pickup 58 comprises a bar member 58a and a flange 58b. The counter-clockwisely rotating force provided by the coiled spring 52 (FIG. 1) permits the lower portion of the bar member 58a and the lower surface of the flange 58b to be brought into contact with this cam face 30a of the cam 30. Where the pickup of this type is employed, the use of the E-ring 32 on the cam 30 is not necessarily required.

Referring now to FIG. 6, the mechanism of the pickup 58 in association with the cam 30 will be described in detail hereinbelow. The bar member 58a is movable along and in abutment with the cam face 30a from its original position to the terminal position. The movement of the bar member 58a forced by the counter-clockwise revolution of the cam 30 provides the magnetic head supporting lever 57 and eventually the magnetic head 56 together with the pad holding lever 60 with a clockwisely rotating force around the shaft 50.

Turning back again to FIG. 2, the bar member 58a of the pickup 58 travels from the original position to the terminal position along the cam face 30a as the cam 30 makes one full counter-clockwise revolution around the shaft 20. As the pickup bar member 58a reached the terminal position on the curved peripheral circumference of the cam face 30a, the pickup bar member is arranged in such a manner to pass through the sensing portion 25a positioned between the photocoupler sensor 25, thereby providing a signal for stopping the motor and consequently stopping the revolution of the cam 30.

Even after the motor stopped, the cam 30 still moves and travels forward a little further by the action of inertia while the pickup bar member 58a is left intact at the terminal position. The pickup bar member 58a is then returned from the terminal position to the orignal position while abutting the lower surface of the pickup member 58b with the upper surface along the cut-away cam edge portion 30c and sliding on the upper surface of the lift portion 23 of the position detecting member 22. The force by which the pickup 58 is returned to the original position is provided by means of the coiled spring 52 by the counter-clockwise counter-action against the clockwisely rotating force given by the revolution of the cam 30. The force for returning the pick 38 to the original position also may be provided by means of a coiled spring 70, as shown in FIG. 2, which is secured at one end thereof to the arm member 57a and at the other end to an inner side of the side member 3a of the protective cover 3. With this arrangement in accordance with the present invention, the pickup 58 may be returned to the original position without shock.

While the tip portion of the pickup bar member 58a slides on the upper surface of the lift portion 23 mounted on the position detecting member 22, the pickup bar member is so lifted upwardly that the arm member 57a of the magnetic head supporting lever 57 is forced downward and the magnetic head 56 is withdrawn from the magnetic recording body 14. This arrangement can achieve an easy withdrawal of the magnetic recording body from the apparatus so that no information tracks recorded thereon are damaged and a good reproduction of the information is achieved. In order to perform substantially the same function acheved by this arrangement for returning the pickup 58 from the terminal position to the original position, a lifting member (not shown) may be mounted on the position detecting member 22 apart from the lift portion 23 in such a manner that the lifting member is arranged to lift the pad holding lever 60. This arrangement may be composed of a lift pin (not shown) under the lower surface of the pad holding lever 60 which extends through a hole (not shown) to the said lifting member, thereby allowing the lift pin in abutment with the upper surface of the lifting member to push upwardly the pad holding member and consequently permitting the pad 61 to separate from the magnetic recording disc 14 and the disc 14 to be withdrawn easily from the apparatus. In this case, the height of the lifting member is greater than that of the cam 30 and the lifting member is mounted apart from the cam face 30a. Likewise, another modification is carried out to achieve such arangement having the function for easily withdrawing the magnetic recording body from the apparatus. In this modification, although specific embodiment is not shown in the attached drawings, a pickup may be mounted under another arm member pivoted orthogonally to the pad holding lever 60 and parallel to the arm member 57b and is arranged to have the tip portion thereof slide on the lift portion 23 mounted on the position detecting member 22 while lifting the pad holding lever 60. In this case, the pickup extends through a hole mounted on the arm member 57b and the back surface of the arm member 57b is a projection which is arranged to perform substantially the same function as the pickup bar member 58a.

Figure 7:
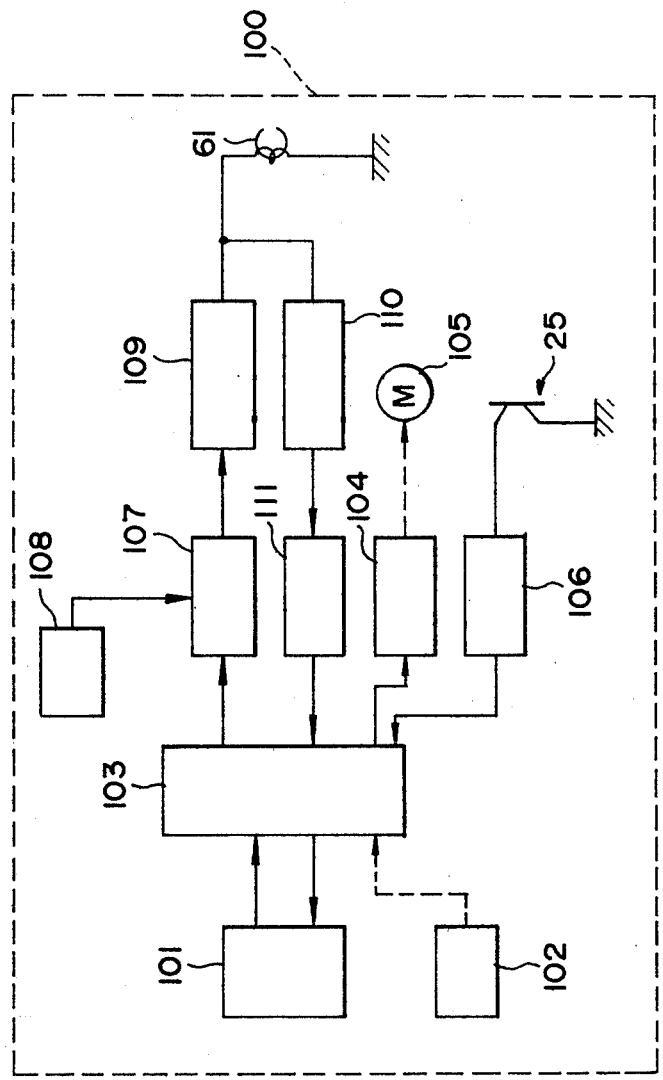
FIG. 7 is a block diagram illustrating the operation of the magnetic recording or reproducing apparatus of the present invention.

Referring now to FIG. 7, there is shown a block diagram illustrating the control circuit 100 which is provided inside the base 2. The control circuit 100 comprises a plurality of circuits for driving and operating the magnetic recording and reproducing apparatus of the present invention.

When the magnetic recording body 14 is inserted through a guide hole 80 provided on the front side of the protective cover 3 and placed in order inside the housing means 1 without engagement of the hole 15b with the locking pin 13 on the card locking drum 12, the output signal for driving the apparatus of the present invention may be provided from a main central processing unit 101 or a drive switch circuit 102 to a secondary cental processing unit 103 and then transmitted to a motor control circuit 104 which drives the motor 105. As the motor 105 rotates the shaft 10 which permits several revolutions of the card locking drum 12 without engagement with the magnetic recording medium body 14. After several free revolutions of the drum, the locking pin 13 is allowed to engage with the hole 15b of the recording body 14, thereby rotating the body concomitantly with the drum 12.

The rotating velocity of the motor 105 is transmitted through the gear wheel 11 and decelerated through the gear wheels 41, 42, and 45 to the gear wheel 21. As set forth hereinabove, the means for decelerating the rotating velocity is not limited to this particular means and any appropriate means adaptable to the apparatus of the present invention may be applied. This arrangement of the gear wheels may allow the gear wheel 21 to rotate concomitantly with the combination of the position detecting member 22 and the cam 30 in a counter-clockwise direction. The position detecting member 22 is arranged in a manner such that, as the edge portion 22a thereof passes through the sensing portion 25a of the sensor 25, the output signal, after shaped by means of a wave shaping circuit 106, is transmitted to the secondary central processing unit 103, whereby the recording or reproducing of the information is carried out by means of the magnetic head 56.

The pickup bar member 58a of the pickup 58 is forced to slide along and in abutment with the cam face 30a and move outwardly from the shortest point to the longest point between the shaft 20 and the cam face by means of the counter-clockwise rotation of the cam 30. Accordingly, the magnetic head holding lever 57 is provided with the counter-clockwisely rotating force to force the magnetic head 56 to travel outwardly on the upper surface of the magnetic recording and reproducing body 14 in correspondence with the revolution of the cam 30. At the same time, as the body 14 is rotating counter-clockwisely in abutment with the sensing portion of the lower surface of the magnetic head 56 and the body may make plural revolutions while the cam 30 makes one revolution, the track of the magnetic head is formed on the upper surface of the body clockwisely, outwardly and spirally in correspondence with the number of revolution of the body, thereby allowing information to be recorded or reproduced along the track followed by means of the magnetic head. When an increase in a density of information is desired, an increase of revolution of the body 14 may achieve this requirement. In this case, tracks of information are narrower to each other so that the sensing ability of the sensor 25 should be increased. In the apparatus of the present invention, since the position of the magnetic head 56 is detectable by means of the cut-away portion 22a provided on the circumference of the position detecting member 22, the sensing ability of the sensor 25 may be increased merely by enlarging the size of the position detecting member 22.

Referring further to FIG. 7, information to be recorded is provided from the secondary central processing unit 103 to a modulator 107, where the information is combined with pulses by a pulse oscillator 108. The modulated signals from the modulator 107 is then amplified by a amplifier 109 for recording which is electrically connected to the magnetic head 61 by which the information is recorded on the magnetic recording body 14 as the magnetic head travels on and in abutment with the surface of said body. The reproduction of the recorded information is carried out by amplifying the information to be reproduced from the magnetic body for reproduction by means of an amplifier 110 through which the amplified reproducible information is given to a modulator 111 where the amplified signals are modulated and then transmitted to the secondary central processing unit 103. The information is further transmitted to the main central processing unit 101, thereby reproducing the information from the information stored in the magnetic body.

As the cut-away edge portion 22b passes through the sensing portion 25a of the sensor 25, the output signal for turning off the power source of the motor 105 is given through the shaping apparatus 106 to the secondary central processing unit 103 which in turn transmits the signal for turning off the motor to the motor control circuit 104, thereby stopping the revolution of the motor.

The magnetic recording or reproducing apparatus according to the present invention can achieve the positioning of its magnetic head with ease and precision and allow the magnetic head to be returned to the original position from the working position without causing any damage on infomation tracks formed on a magnetic recording disc.

What is claimed is:

1. A magnetic recording or reproducing apparatus comprising:
   (1) a magnetic body for recording or reproducing information;
   (2) a magnetic head for sensing said information;
   (3) means for mounting said magnetic body;
   (4) means for supporting said magnetic body;
   (5) means for driving and rotating said magnetic body mounting means;
   (6) means for supporting said magnetic head;
   (7) means for mounting said magnetic head supporting means;
   (8) means for pressing said magnetic head to thereby clamping said magnetic body;
   (9) means for detecting the position of said magnetic head supporting means;
   (10) means for mounting said position detecting means;
   (11) a cam mounted integrally on said position detecting means;
   (12) means for sliding along and in abutment with the cam face of said cam;
   (13) said sliding means mounted integrally with said magnetic head supporting means;
   (14) means for rotating said magnetic head supporting means against the action provided by the movement of said sliding means;
   (15) means for transmitting the rotating force provided by said driving means to said position detecting means in a decelerating manner; and

(16) means for sensing the position for starting and terminating recording or reproduction of said information.

2. The magnetic recording or reproducing apparatus claimed in claim 1, wherein said magnetic body supporting body comprises means for positioning said magnetic body.

3. The magnetic recording or reproducing apparatus claimed in claim 2, wherein said magnetic body positioning means is mounted movably on said rotating means for said magnetic body mounting means.

4. The magnetic recording or reproducing apparatus claimed in claim 1, wherein said magnetic head supporting means is rotatably mounted on said magnetic head mounting means.

5. The magnetic recording or reproducing apparatus claimed in claim 1, wherein said magnetic head pressing means is mounted pivotably on said magnetic head supporting means.

6. The magnetic recording or reproducing apparatus claimed in claim 1, wherein said position detecting means includes a lift portion for lifting said traveling means.

7. The magnetic recording or reproducing apparatus claimed in claim 1, wherein said position detecting means includes a lifting member for lifting said magnetic head pressing means.

8. The magnetic recording or reproducing apparatus claimed in claim 1, wherein said magnetic head pressing means is provided with a portion having a member for abutting with said lift portion positioned on said position detecting means and for lifting said magnetic head pressing means.

9. The magnetic recording or reproducing apparatus claimed in claim 1, wherein said cam has a cam face having a curve formed by traveling on the path of a point in a plane moving around a centered point thereof while continuously and outwardly receding proportional to the angle of the revolution of said cam from a point apart from the center of the shaft hole of said cam to a point reached by one full revolution of said cam around said shaft hole thereof.

10. The magnetic recording or reproducing apparatus claimed in claim 1, wherein said means for sliding around said cam includes a bar member sliding along said cam face while being in abutment with said cam face.

* * * * *

UNITED STATES PATENT OFFICE
CERTIFICATE OF CORRECTION

PATENT NO. : 4,314,292
DATED : February 2, 1982
INVENTOR(S) : Takayuki Umaba

It is certified that error appears in the above-identified patent and that said Letters Patent are hereby corrected as shown below:

In the drawings, Sheet 1, Figure 1A should be deleted in its entirety; Sheet 2, figure designation "Fig. 1B" should be changed to --Fig. 1--.

Signed and Sealed this

Twenth-eighth Day of September 1982

[SEAL]

Attest:

GERALD J. MOSSINGHOFF

Attesting Officer      Commissioner of Patents and Trademarks